United States Patent
Verreault et al.

(10) Patent No.: US 10,065,396 B2
(45) Date of Patent: Sep. 4, 2018

(54) AMORPHOUS METAL OVERMOLDING

(71) Applicant: Crucible Intellectual Property, LLC, Rancho Santa Margarita, CA (US)

(72) Inventors: Adam A. Verreault, Dove Canyon, CA (US); Sean T. O'Keeffe, Tustin, CA (US); Glenton R. Jelbert, Foothill Ranch, CA (US)

(73) Assignee: Crucible Intellectual Property, LLC, Rancho Santa Margarita, CA (US)

( * ) Notice: Subject to any disclaimer, the term of this patent is extended or adjusted under 35 U.S.C. 154(b) by 564 days.

(21) Appl. No.: 14/537,384

(22) Filed: Nov. 10, 2014

(65) Prior Publication Data

US 2015/0202841 A1     Jul. 23, 2015

Related U.S. Application Data

(60) Provisional application No. 61/930,258, filed on Jan. 22, 2014.

(51) Int. Cl.
    *B22D 17/00*        (2006.01)
    *B32B 15/01*        (2006.01)
    (Continued)

(52) U.S. Cl.
    CPC .............. *B32B 15/01* (2013.01); *B22D 17/00* (2013.01); *B22D 19/00* (2013.01); *B32B 15/18* (2013.01);
    (Continued)

(58) Field of Classification Search
None
See application file for complete search history.

(56) References Cited

U.S. PATENT DOCUMENTS 4,163,877 A * 8/1979 Schonstedt .............. G01V 3/15
                                                            324/226
4,352,951 A    10/1982   Kyle
(Continued)

FOREIGN PATENT DOCUMENTS

DE         3133599        3/1983
EP         0723031        7/1996
(Continued)

OTHER PUBLICATIONS

Hays et al., "Microstructure Controlled Shear Band Pattern Formation and Enhanced Plasticity of Bulk Metallic Glasses Containing in situ Formed Ductile Phase Dendrite Dispersions," *Physical Review Letters*, vol. 84, No. 13, Mar. 27, 2000, pp. 2901-2904.
(Continued)

*Primary Examiner* — Adam Krupicka
(74) *Attorney, Agent, or Firm* — Brownstein Hyatt Farber Schreck, LLP

(57) ABSTRACT

An embodiment relates to a method comprising overmolding a bulk-solidifying amorphous alloy on a preform of another material than the bulk-solidifying amorphous alloy to form a bulk-solidifying amorphous alloy overmolded preform. Another embodiment relates to an article comprising an overmolded shell comprising the bulk-solidifying amorphous alloy on a preform of another material than the bulk-solidifying amorphous alloy. The preform could be made of a crystalline or amorphous metal or alloy such as aluminum, stainless steel, copper or beryllium.

20 Claims, 13 Drawing Sheets

(51) Int. Cl.
   *B22D 19/00* (2006.01)
   *B32B 15/20* (2006.01)
   *B32B 15/18* (2006.01)

(52) U.S. Cl.
   CPC .......... *B32B 15/20* (2013.01); *B32B 2250/02* (2013.01); *Y10T 428/12729* (2015.01); *Y10T 428/12736* (2015.01); *Y10T 428/12903* (2015.01); *Y10T 428/12979* (2015.01)

(56) References Cited

U.S. PATENT DOCUMENTS

| | | | |
|---|---|---|---|
| 4,371,588 A | 2/1983 | Kyle | |
| 4,512,791 A | 4/1985 | Kyle | |
| 4,562,951 A | 1/1986 | Cytron | |
| 4,621,031 A | 11/1986 | Scruggs | |
| 4,626,002 A | 12/1986 | Hagemeister et al. | |
| 4,665,294 A | 5/1987 | Hira | |
| 4,830,262 A | 5/1989 | Ishibe | |
| 5,188,990 A | 2/1993 | Dumesnil et al. | |
| 5,198,043 A | 3/1993 | Johnson | |
| 5,288,344 A | 2/1994 | Peker et al. | |
| 5,368,659 A | 11/1994 | Peker et al. | |
| 5,482,580 A | 1/1996 | Scruggs et al. | |
| 5,618,359 A | 4/1997 | Lin et al. | |
| 5,735,975 A | 4/1998 | Lin et al. | |
| 5,741,604 A | 4/1998 | Deakin et al. | |
| 5,896,642 A | 4/1999 | Peker et al. | |
| 6,010,580 A | 1/2000 | Dandiker et al. | |
| 6,325,868 B1 | 12/2001 | Kim et al. | |
| 6,357,763 B2 | 3/2002 | Mathew et al. | |
| 6,669,899 B2 | 12/2003 | Bae et al. | |
| 6,692,590 B2 | 2/2004 | Xing et al. | |
| 6,771,490 B2 | 8/2004 | Peker | |
| 6,818,078 B2 | 11/2004 | Kim et al. | |
| 6,989,493 B2 | 1/2006 | Hipwell, Jr. et al. | |
| 7,067,020 B2 | 6/2006 | Poon et al. | |
| 7,560,001 B2 | 7/2009 | Peker | |
| 7,575,040 B2 | 8/2009 | Johnson | |
| 7,618,499 B2 | 11/2009 | Johnson et al. | |
| 7,806,997 B2 | 10/2010 | Demetriou et al. | |
| 7,862,957 B2 | 1/2011 | Wende | |
| 7,947,134 B2 | 5/2011 | Lohwongwatana et al. | |
| 8,032,194 B2 | 10/2011 | Liu et al. | |
| 8,247,795 B2 | 8/2012 | Jun et al. | |
| 8,335,050 B2 | 12/2012 | Kavosh | |
| 8,480,864 B2 | 7/2013 | Farmer et al. | |
| 8,529,712 B2 | 9/2013 | Demetriou et al. | |
| 9,027,630 B2 | 5/2015 | Prest et al. | |
| 9,103,009 B2 | 8/2015 | Prest et al. | |
| 9,302,319 B2 | 4/2016 | Prest et al. | |
| 9,375,788 B2 | 6/2016 | Prest et al. | |
| 2002/0132131 A1 | 9/2002 | Bossmann et al. | |
| 2006/0063059 A1 | 3/2006 | Lewinsohn et al. | |
| 2007/0048887 A1 | 3/2007 | Erlach et al. | |
| 2007/0217163 A1 | 9/2007 | Greatbatch et al. | |
| 2007/0226979 A1 | 10/2007 | Paton et al. | |
| 2009/0079137 A1 | 3/2009 | Cross | |
| 2010/0221484 A1 | 9/2010 | Meade | |
| 2010/0289003 A1 | 11/2010 | Kahen et al. | |
| 2010/0304065 A1* | 12/2010 | Tomantschger | B32B 15/08 428/35.8 |
| 2011/0162795 A1 | 7/2011 | Pham et al. | |
| 2011/0163509 A1 | 7/2011 | Pham et al. | |
| 2012/0129002 A1* | 5/2012 | Chang | C23C 14/021 428/651 |
| 2013/0105300 A1* | 5/2013 | Jang | C22C 45/10 204/192.15 |
| 2013/0212856 A1* | 8/2013 | Winkler | B21J 1/006 29/428 |
| 2014/0011050 A1 | 1/2014 | Poole et al. | |
| 2015/0368769 A1 | 12/2015 | Prest et al. | |

FOREIGN PATENT DOCUMENTS

| | | |
|---|---|---|
| JP | H06063741 | 3/1994 |
| JP | H06063771 | 3/1994 |
| JP | H09317959 | 12/1997 |
| JP | 2001303218 | 10/2001 |
| JP | 2006524896 | 11/2006 |
| JP | 2007000895 | 1/2007 |
| WO | WO 09/070701 | 6/2009 |

OTHER PUBLICATIONS

Inoue et al., Bulk amorphous alloys with high mechanical strength and good soft magnetic properties in Fe—TM—B (TM=IV-VIII group transition metal) system, *Appl. Phys. Lett.*, 71 (4), 1977, pp. 464-466.

Physical Ductility of the Elements; http://www.failurecriteria.com/physicalductilit.html; no date available; 6 pages.

Schroers et al., "Gold based bulk metallic glass," *Applied Physics Letters*, vol. 87 061912, 2005, 3 pages.

Shen et al., Bulk Glassy $Co_{43}Fe_{20}Ta_{5.5}B_{31.5}$ Alloy with High Glass-Forming Ability and Good Soft Magnetic *Properties, Materials Transactions*, vol. 42, No. 10, 2001, pp. 2136-2139.

\* cited by examiner

AMORPHOUS METAL OVERMOLDING

CROSS-REFERENCE TO RELATED APPLICATION(S)

This application claims priority to provisional U.S. Patent Application No. 61/930,258, filed Jan. 22, 2014, which is hereby incorporated by reference in its entirety.

FIELD

The described embodiments relate generally to overmolding an amorphous metal alloy such as a bulk-solidifying amorphous alloy on a substrate. More particularly, the present embodiments relate to utilizing a preform of another material (aluminum, stainless steel, copper beryllium, etc.) that can be placed directly into a mold prior to the injection of the molten bulk-solidifying amorphous alloy.

BACKGROUND

A large portion of the metallic alloys in use today are processed by solidification casting, at least initially. The metallic alloy is melted and cast into a metal or ceramic mold, in which it solidifies. The mold is stripped away, and the cast metallic piece is ready for use or further processing. The as-cast structure of most materials produced during solidification and cooling depends upon the cooling rate. There is no general rule for the nature of the variation, but for the most part the structure changes only gradually with changes in cooling rate. On the other hand, for the bulk-solidifying amorphous alloys the change between the amorphous state produced by relatively rapid cooling and the crystalline state produced by relatively slower cooling is one of kind rather than degree—the two states have distinct properties.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. This amorphous state can be highly advantageous for certain applications. The fabrication of amorphous alloy can involve melting an alloy feedstock into a molten state and subsequently quenching the molten feedstock to create the final alloy form. However, pre-existing forming or processing methods often result in high product cost when it comes to high aspect ratio products (e.g., thin sheets) or three-dimensional hollow products. Moreover, the pre-existing methods can often suffer the drawbacks of producing products that lose many of the desirable mechanical properties as observed in an amorphous alloy.

SUMMARY

One aspect of this disclosure provides a method including overmolding a bulk-solidifying amorphous alloy on a preform of another material than the bulk-solidifying amorphous alloy to form a bulk-solidifying amorphous alloy overmolded preform.

Another aspect of this disclosure provides an article having an overmolded shell comprising the bulk-solidifying amorphous alloy on a preform of another material than the bulk-solidifying amorphous alloy.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 12:
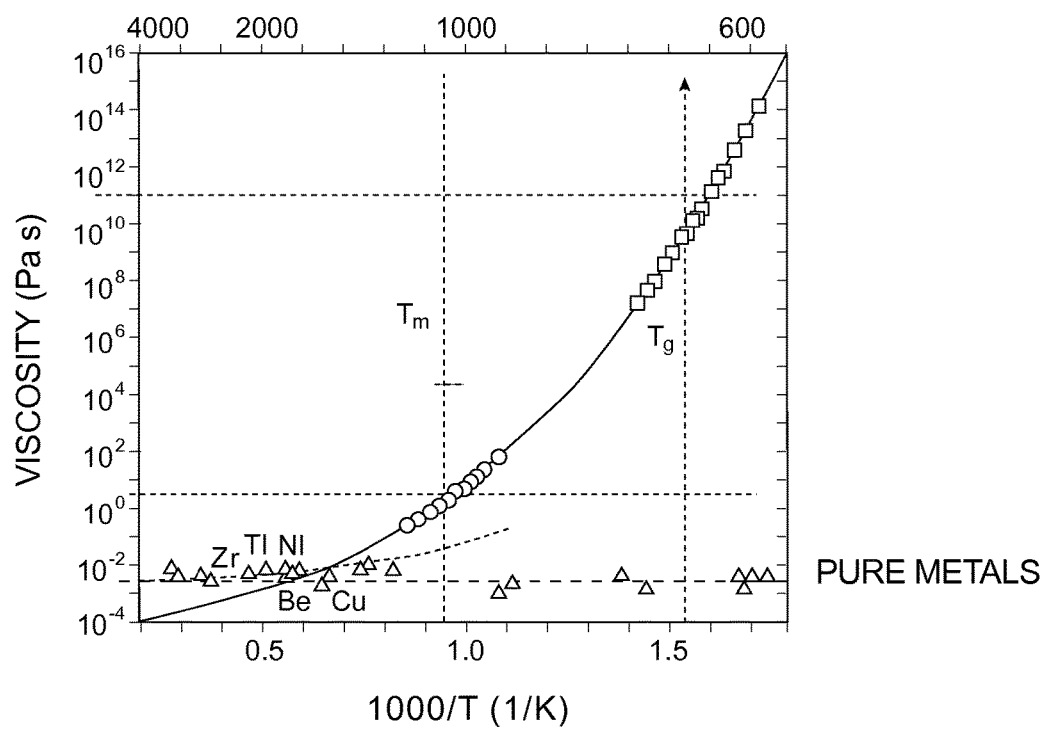
FIG. 12 provides a temperature-viscosity diagram of an exemplary bulk solidifying amorphous alloy.

FIG. 12 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 13:
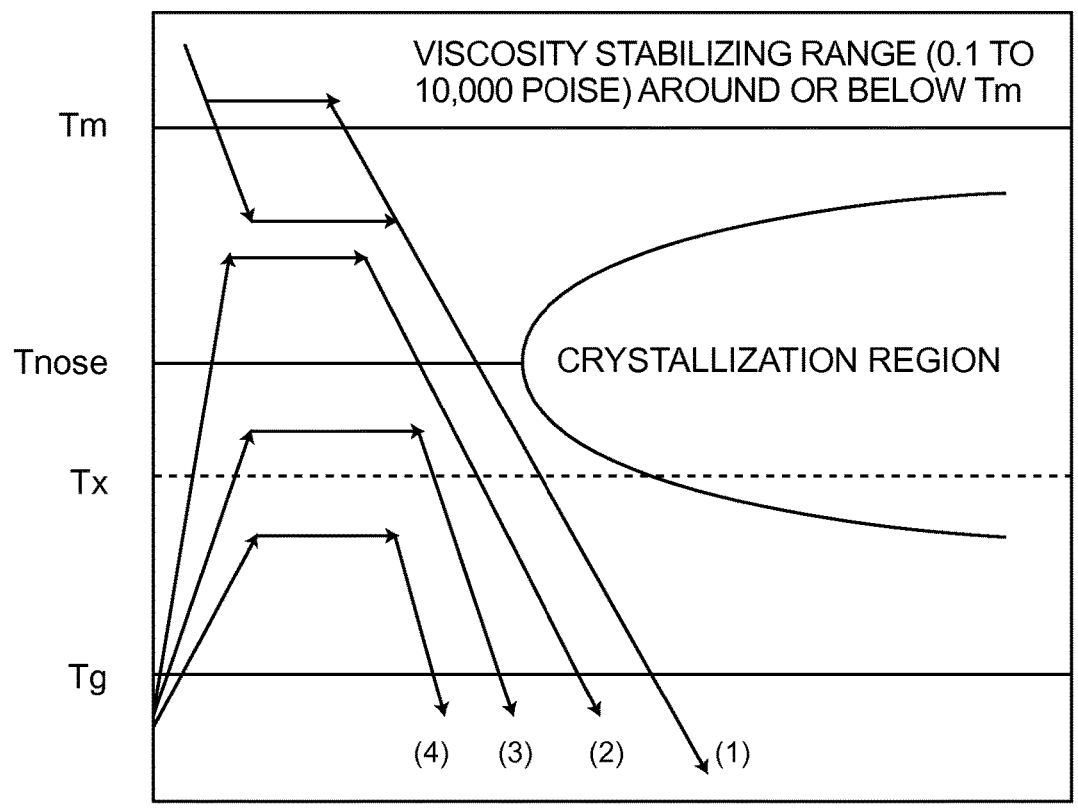
FIG. 13 provides a schematic of a time-temperature-transformation (TTT) diagram for an exemplary bulk solidifying amorphous alloy.

FIG. 13 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 13. In FIG. 13, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 13, Tx is shown as a dashed line as Tx can vary from close to Tm to close to Tg.

The schematic TTT diagram of FIG. 13 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 13, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, has sium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

The described embodiments relate generally to overmolding an amorphous metal alloy such as a bulk-solidifying amorphous alloy on a substrate. More particularly, the present embodiments relate to utilizing a preform of another material (aluminum, stainless steel, copper beryllium, etc.) that can be placed directly into a mold prior to the injection of the molten bulk-solidifying amorphous alloy. This preform would be machined in such a way to closely match the geometry of the desired part, where the bulk-solidifying amorphous alloy will surround and mechanically (and possibly chemically) bond with the preform. This would leave a thinner shell of bulk-solidifying amorphous alloy on all cosmetic surfaces requiring such properties that can be delivered by a bulk metallic glass (surface finish, hardness, scratch resistance, etc.).

The preform would be placed into the mold by way of a robot and when the mold is closed, the preform would become clamped and become immovable inside the system. This keeps the preform in place during the injection of the bulk-solidifying amorphous alloy. Upon completion of the injection, the bulk-solidifying amorphous alloy overmolded preform would then be removed from the mold by a robot. The overmolded preform could already be in its final form or it may be post-processed using standard machining equipment that is much more readily available for known metals such as aluminum, stainless steel and others.

The equipment used for this would be a bulk-solidifying amorphous alloy casting machine to produce the parts. Preforms would be made using standard machining equipment (latch, mill, CNC) to produce the required shape.

The advantages that this disclosure has over other existing products or technology, and how this disclosure is distinct from prior alternatives consists of being able to reduce part cost by minimizing mass of bulk metallic glass material required for part and increasing the number of parts that can be cast per shot. The volume of bulk metallic glass material is reduced significantly because rather than the entire part being made from this material, only a fraction of it is composed of the BMG. By doing this, material cost per part is reduced and the ability to get more cavities into the tool can be realized. Both of these factors loom large in the cost of the final part.

In addition, this disclosure creates larger parts by utilizing less of the bulk metallic glass material by minimizing the amount of BMG material used, a larger part could be generated because much of the volume could be taken up by the preform material. This could unlock the ability to cast parts that are currently outside of the size envelope available to us on the existing equipment. Right now, parts are limited to about 100 grams of BMG material (~15 cc volume). Utilizing all of this material to generate a thinner shell on an existing preform could make much larger parts.

Furthermore, this disclosure increases amorphous content by reducing wall thickness and utilizing materials with a higher thermal conductivity than tool steel used for molds. The ability to create a high quality BMG is to minimize the wall thickness while still maintaining the ability to completely fill the part in a casting environment. By utilizing the preform, parts have a greater chance of becoming amorphous primarily because the wall thickness is reduced from up to 8.0 mm down to 1.0 mm or less. In addition to this, many of the preform materials that may be used, specifically aluminum, have a much higher thermal conductivity (200 W/m*K in this case) which can be used to pull heat away from the BMG much faster than a typical tool steel used for the mold cavities, such as H13 (24 W/m*K).

Post-processing of components simpler and cheaper by machining features out of more machinable metal such as aluminum, stainless steel, or some other non-BMG material. BMG materials are known to be difficult and expensive to machine due to the brittle nature of the material and the rapid wear of machine tools. By designing the part so that the preform material is the material which will be machined after the casting process, this would significantly decrease the costs of manufacturing a component with internal undercuts, threads, and other features that cannot be directly cast and replicated in the mold.

Also, this disclosure improves cosmetics of final part by optimizing wall thickness transitions throughout the part. On many parts, the cosmetics become the most important feature. By optimizing the part design to minimize disturbances in flow (flow lines, knit lines, etc.) through the part during injection, the cosmetics of the part can be improved. Reducing the "thick-to-thin-to-thick" flow of the material through cross-sections in the part, porosity can also be reduced which could improve the cosmetics of the part.

Also, this disclosure provides superior material properties by possessing properties from both metals similar to that of a composite. In some cases, a part may require material properties that a BMG cannot obtain. For example, most BMG alloys that are commercially used are very high strength but are also brittle. By combining bulk-solidifying amorphous alloy with another alloy (stainless steel for example), which has a much lower yield strength but has superior ductility, you may be able to avoid a catastrophic failure of the part. As another option, bulk-solidifying amorphous alloy could be combined with aluminum to produce a part that weighs less than one that would be made completely out of BMG due to the reduced density of aluminum.

This disclosure provides hermetically sealed electrical connections by overmolding BMG over or through a non-conductive material. The inventors have prototyped overmolding BMG through a ceramic disk with a hole in it. The BMG fills the entire hole and provides a hermetic (vacuum tight) seal between the ceramic and the BMG. The hermetic seal is provided on either side of the part or preform that is overmolded. The BMG can then be used as a means of providing an electrical connection but also have the hermetic seal around it. Further, the overmolded part or preform substantially or entirely limits permeation through the hole of the disk. That is, no liquid, fluid, gas, or air travel through the hold in the disk.

This disclosure generates embossed imprints by overmolding BMG into cavities in another material. A potentially worthy design feature can be made by filling small cavities in a preform material (such as a ceramic or other metal) such that the BMG finish would be accentuated against a different background.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
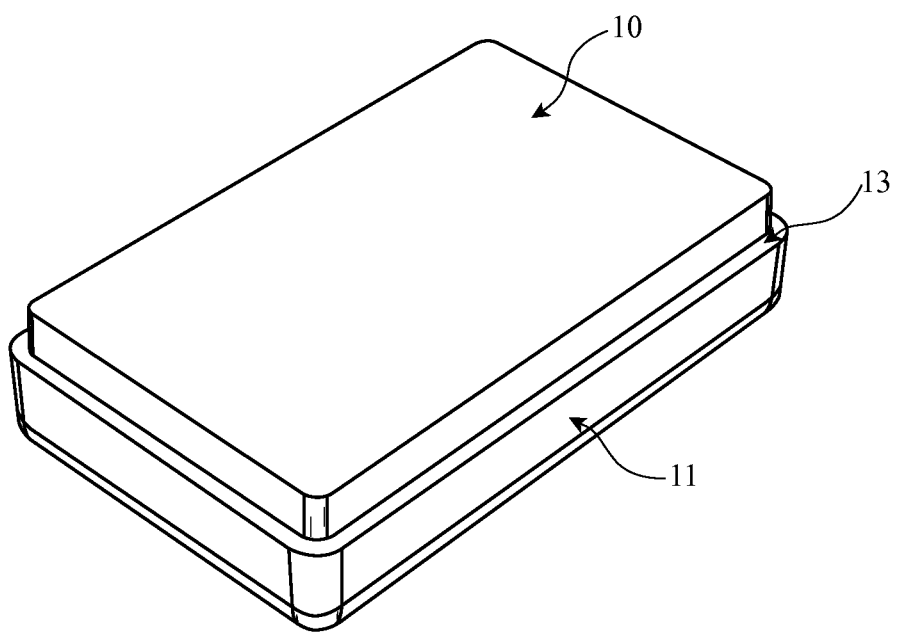
FIG. 1 shows a perspective view of a preform in accordance with an embodiment of this disclosure.

FIG. 1 shows a perspective view of an exemplary preform 10 in accordance with an embodiment of this disclosure. The preform 10 may be formed from any number of materials, including, but not limited to aluminum, ceramic, stainless steel, or copper beryllium. The preform 10 may be formed of any material(s) capable of withstanding high temperatures of the injected molten bulk amorphous alloy. For example, the material used to make preform 10 may be able to withstand temperatures at substantially 700 degrees Fahrenheit. The preform 10 may be machined based on a part for molding therearound, for example. In an embodiment, the preform 10 includes an outer surface 11. The outer surface 11 may include one or more portions or surfaces 13 that may be recessed or indented, such as an edge, a cavity, or an undercut, for example. Although only one extending edge surface 13 is shown in FIG. 1, it should be understood—as further noted later—that any number of surfaces 13, undercuts, cavities, or other geometric shapes may be provided in the outer surface 11 of the preform 10, depending on the desired part to be molded. The recessed surface can have a predetermined geometry. The part can be solid or hollow. In general, the preform 10 may be machined in such a way to closely match a geometry of a desired molded part.

Figure 2:
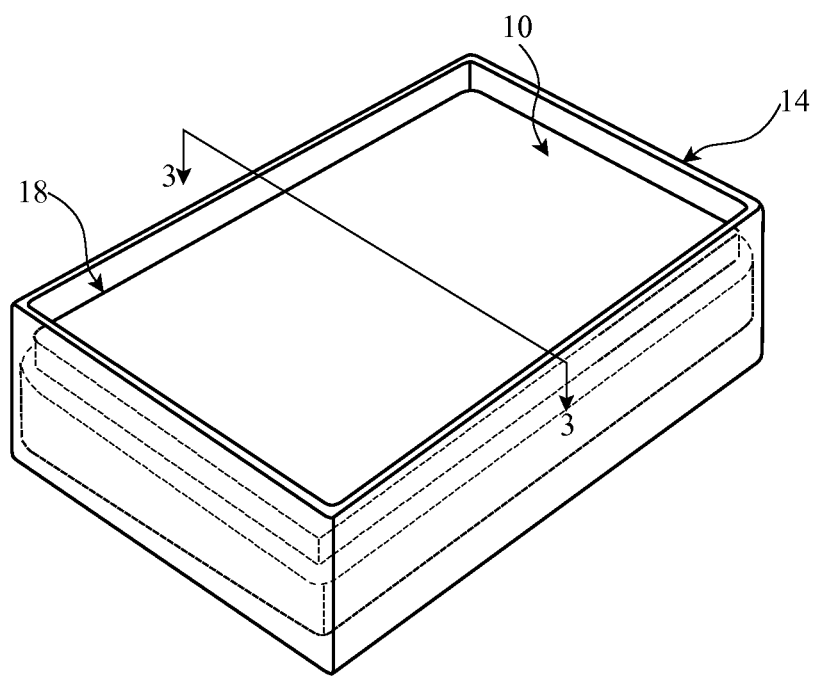
FIG. 2 shows a perspective view of the preform of FIG. 1 in a mold in accordance with an embodiment of this disclosure.

The preform 10 is configured for insertion into a mold 14, an example of which is shown in part in FIG. 2. The preform 10 is placed into a part of the mold 14 by way of a robot and when the mold is closed, e.g., by a lid 16 or an opposing part (which can be of a similar or different shape than the part of the mold 14 in which the preform 10 is placed), the preform 10 may become clamped and become immovable inside the system or apparatus. This keeps the preform in place during the injection of the bulk-solidifying amorphous alloy.

Figure 3:
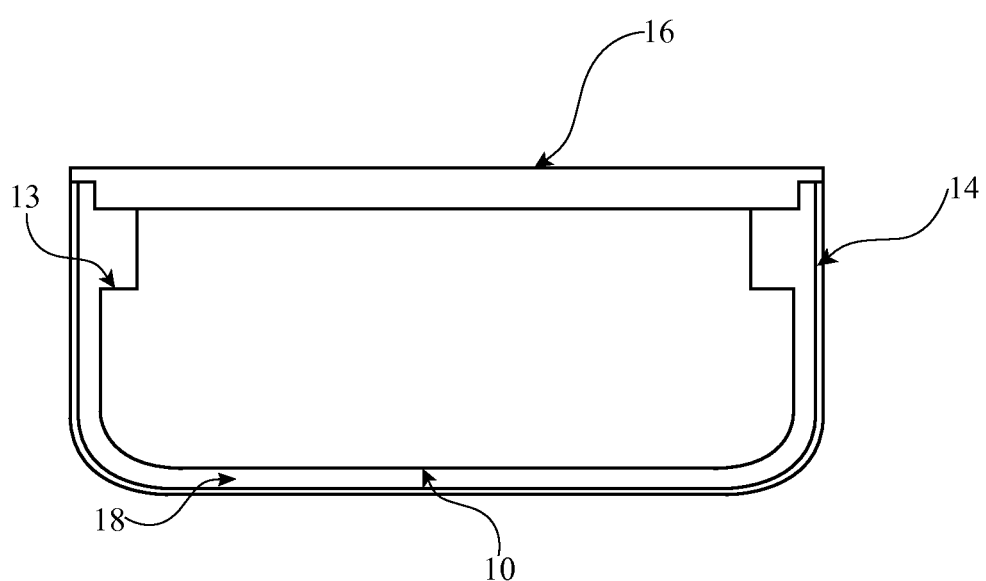
FIG. 3 shows a cross section taken along line 3-3 of FIG. 2.

As shown in the exemplary embodiment of FIG. 2, after placement directly into the mold 14 (prior to injection of molten bulk-solidifying amorphous alloy), a gap 18 or space may be provided between the walls of the mold 14 and the outer wall 11 of the preform 10, for example. FIG. 3 further illustrates an example of such a gap 18 between the side walls and bottom wall of the preform 10. The gap 18 allows for a thinner shell of bulk-solidifying amorphous alloy to be injected therein for bonding on all cosmetic surfaces of the preform 10.

The walls of the mold 14 themselves may be formed or shaped such that the walls form features on the molded part as well.

In an embodiment, once injected into the gap 18, the bulk-solidifying amorphous alloy surrounds and mechanically (and possibly chemically) bonds with the preform 10. In one embodiment, the surface 11 of the preform 10 may include a surface layer thereon (or on parts thereof) that causes a chemical reaction for chemically bonding with the molten alloy 12 that is injected into the mold 14.

Figure 4:
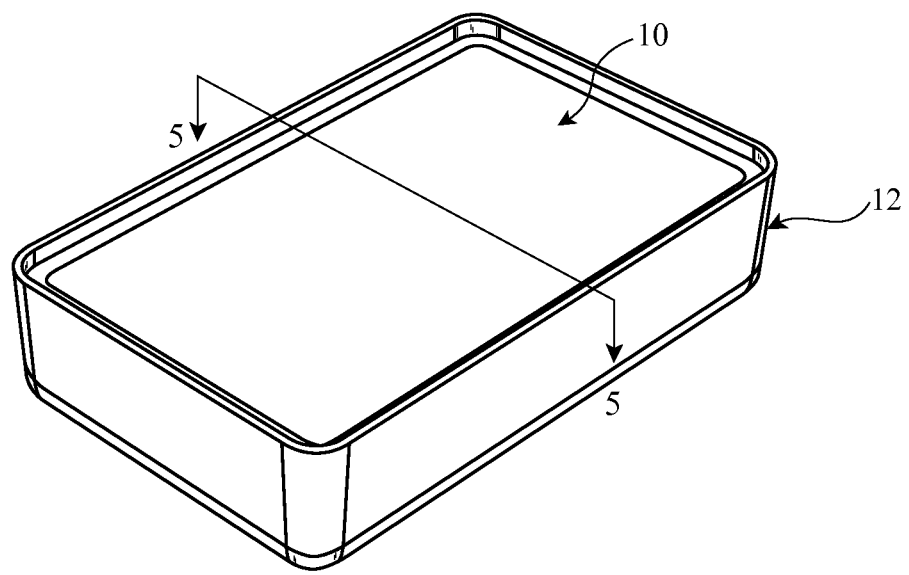
FIG. 4 shows a perspective view of an overmolded layer provided on an outer surface of the preform of FIG. 1 after using the mold of FIG. 2 in accordance with an embodiment of this disclosure.
Figure 5:
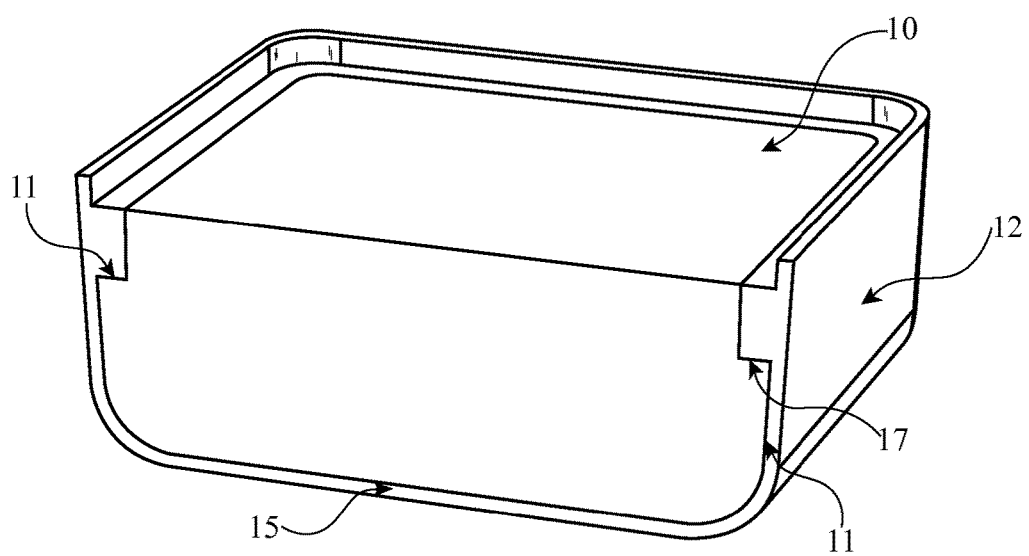
FIG. 5 shows a perspective view of a cross section taken along line 5-5 of FIG. 4.

Upon completion of the injection, the bulk-solidifying amorphous alloy overmolded preform would then be removed from the mold by a robot. FIGS. 4 and 5 show an example of the preform 10 with the alloy 12 overmolded thereon (also referred to as an "overmolded preform throughout this disclosure) and removed from the mold 14. The illustrated embodiment is an example of an article having an overmolded shell comprising the molded bulk-solidifying amorphous alloy 12 on a preform 10 of another material than the bulk-solidifying amorphous alloy. Further, in this embodiment, the molded bulk amorphous alloy 12 is at least mechanically bonded to the outer surface 11 of the preform 10 via an edge 17 (see FIG. 5) that is formed against the surface(s) 13 of the preform 10. That is, FIG. 5 shows an example of the mating between surfaces of the preform 10 and molded alloy 12.

The overmolded preform could already be in its final form or it may be post-processed using standard machining equipment that is much more readily available for known metals such as aluminum, stainless steel and others. For example, after the molded part of bulk amorphous alloy 12 is cast over the preform 10, the material of the preform 10 may be machined out in its center to partially or entirely. In an embodiment, threaded holes, undercuts and other mating features for additional components to be housed inside of the preform may be formed.

Figure 6:
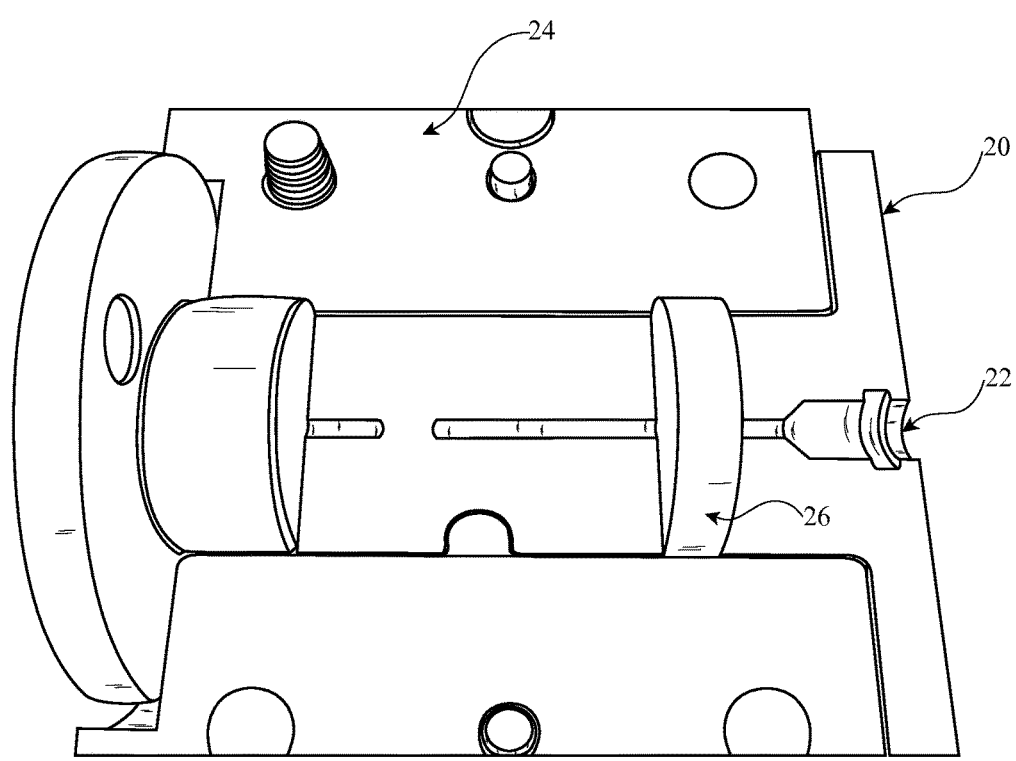
FIG. 6 shows a top perspective view of an apparatus showing first part of an exemplary mold for housing a preform therein in accordance with an embodiment of this disclosure.

FIG. 6 shows a top perspective view of an apparatus 24 showing a first part of an exemplary mold 20 for housing a preform 26 therein in accordance with another embodiment of this disclosure. Although only the first (or bottom) part of the mold 20 is shown, it should be understood to one of ordinary skill in the art that a second part of the mold 20 (not shown) may be aligned and locked against the first part of the mold 20, to clamp and lock the preform 26 therein. In the illustrated embodiment, the second part (not shown) of the mold 20 is a mirror or complimentary part to the first part.

Figure 7:
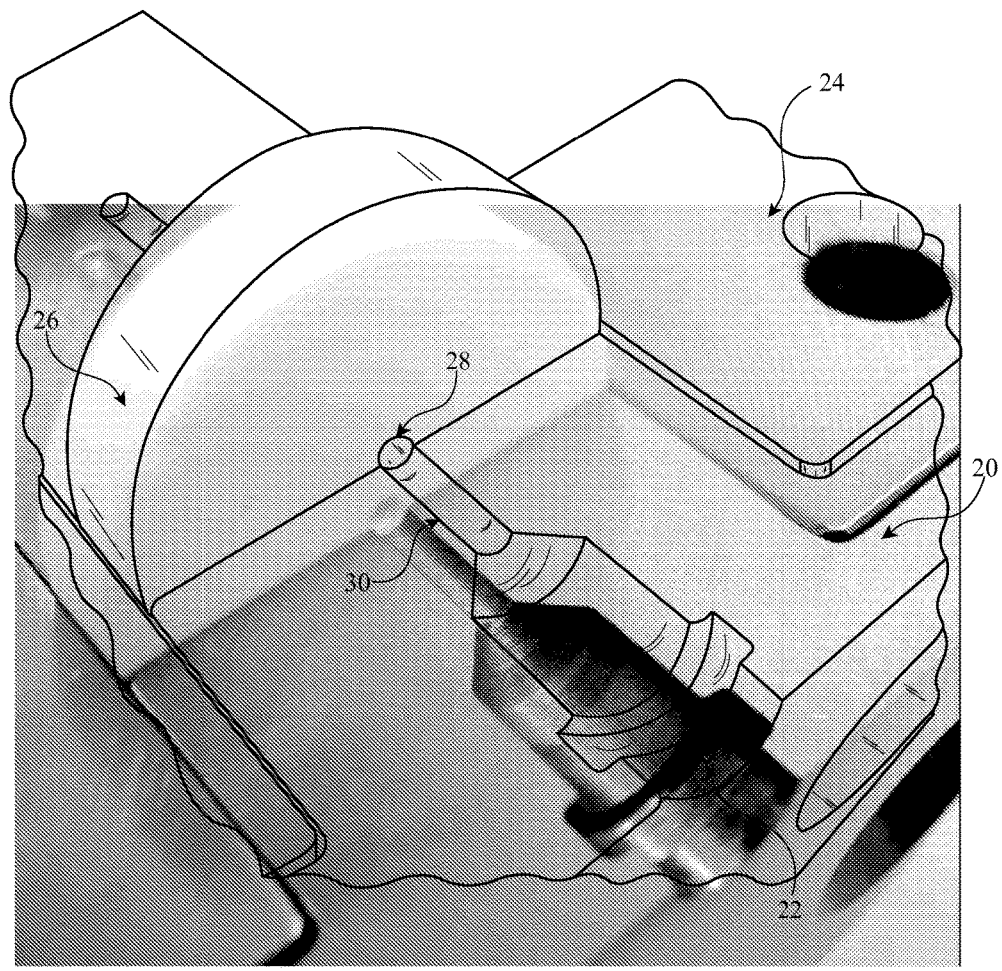
FIG. 7 shows a detailed side perspective view of a gating region of the mold of FIG. 6 through which amorphous alloy is injected therein into the mold in accordance with an embodiment of this disclosure.

The mold 20 includes a gating region 22 therein, through which bulk amorphous alloy is injected, as seen in FIG. 7, for example.

Figure 8:
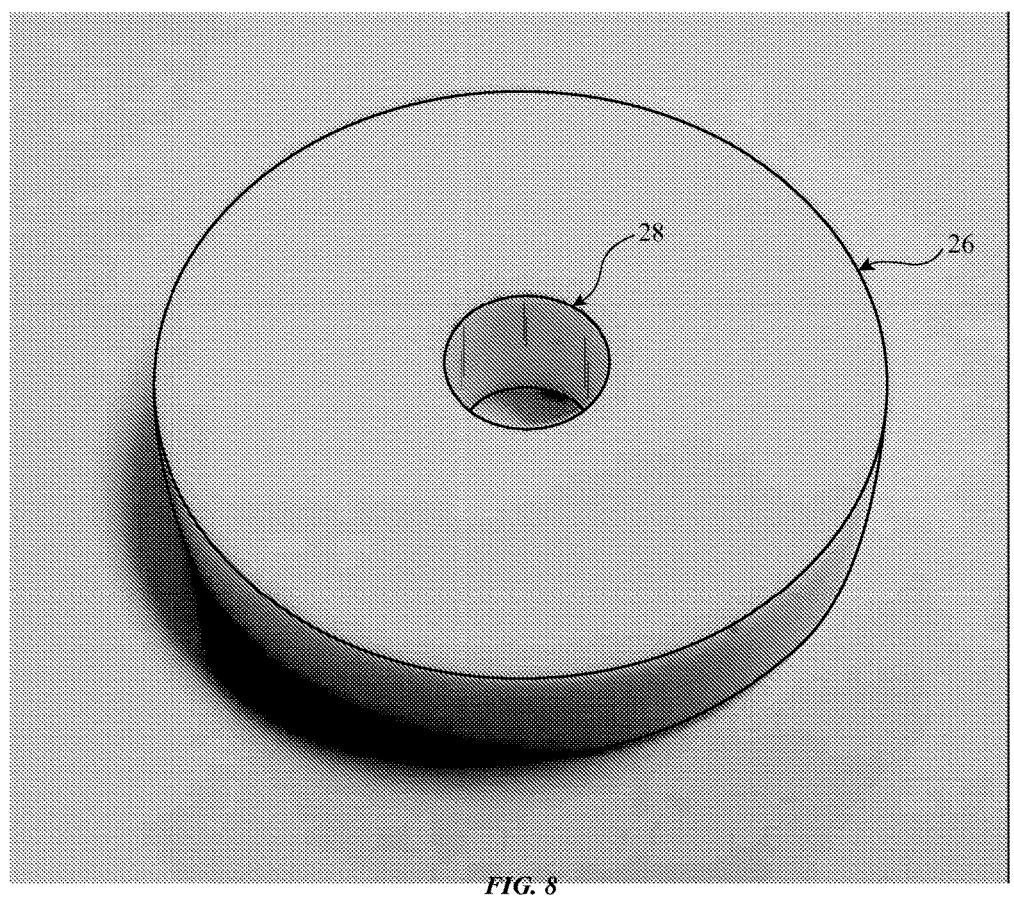
FIG. 8 shows a perspective view of an exemplary preform in accordance with an embodiment of this disclosure.

FIG. 8 shows a perspective view of the exemplary preform 26 provided in the mold 20 in apparatus 24. The preform 26 or part is shown in the form of a disk with a hole 28 through it center. The hole 28 allows for the flow or traveling of molten alloy therethrough (e.g., to the other side of the preform 26 and the mold 20). Of course, the illustrated preform 26 is not intended to be limiting, and its shape and configuration is show for illustrative purposes only.

In an embodiment, the preform 26 is formed from a ceramic material.

To form a molded bulk amorphous alloy part 32, a second (top) part (not shown) of the mold 20 is mated with the first part of the mold 20. Molten BMG is then injected, e.g., via gating region 22, into the mold 20. The BMG fills the mold 20 and is injected through and into entire hole 28 of the preform 26. The injection of the BMG material provides a hermetic (vacuum tight) seal between the preform 26 and the molded BMG.

Figure 9:
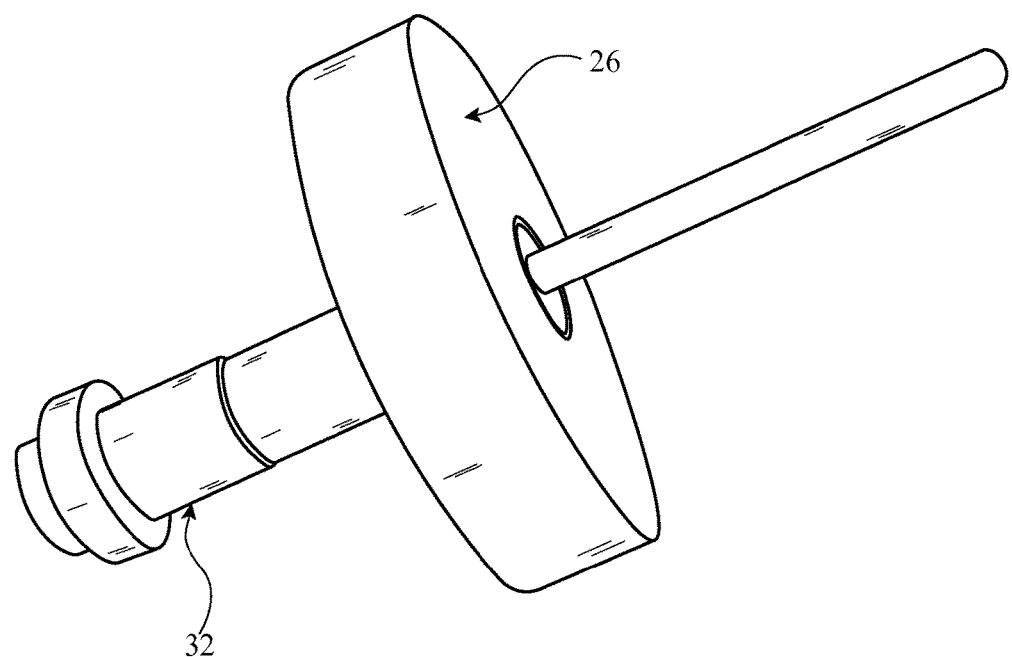
FIG. 9 shows a perspective view of the exemplary preform of FIG. 8 with the molded part attached thereto after overmolding using the mold of FIG. 6 in accordance with an embodiment of this disclosure.
Figure 10:
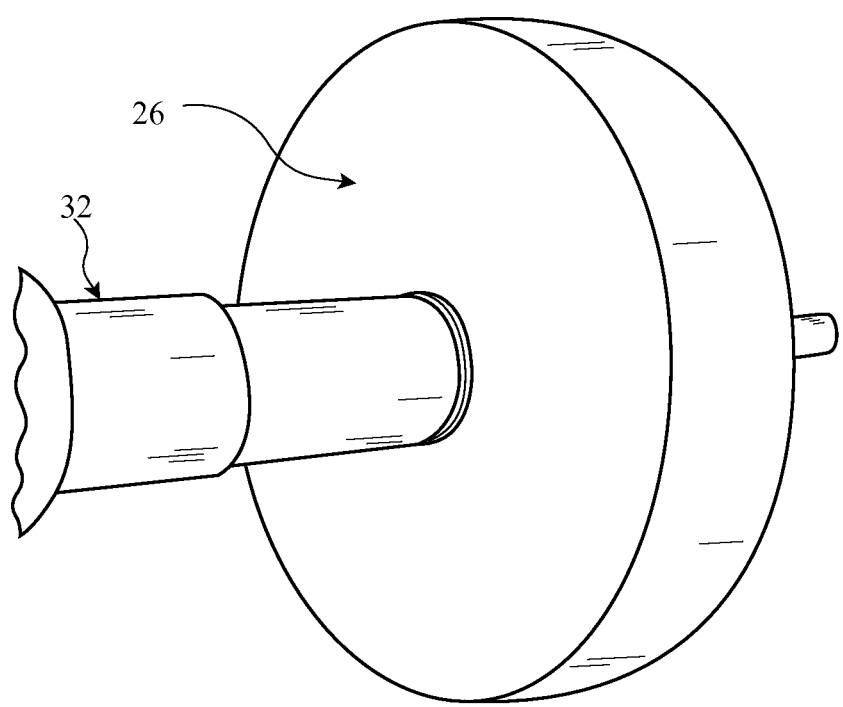
FIG. 10 shows a detailed perspective view of a first side of the preform and molded part of FIG. 9 in accordance with an embodiment of this disclosure.
Figure 11:
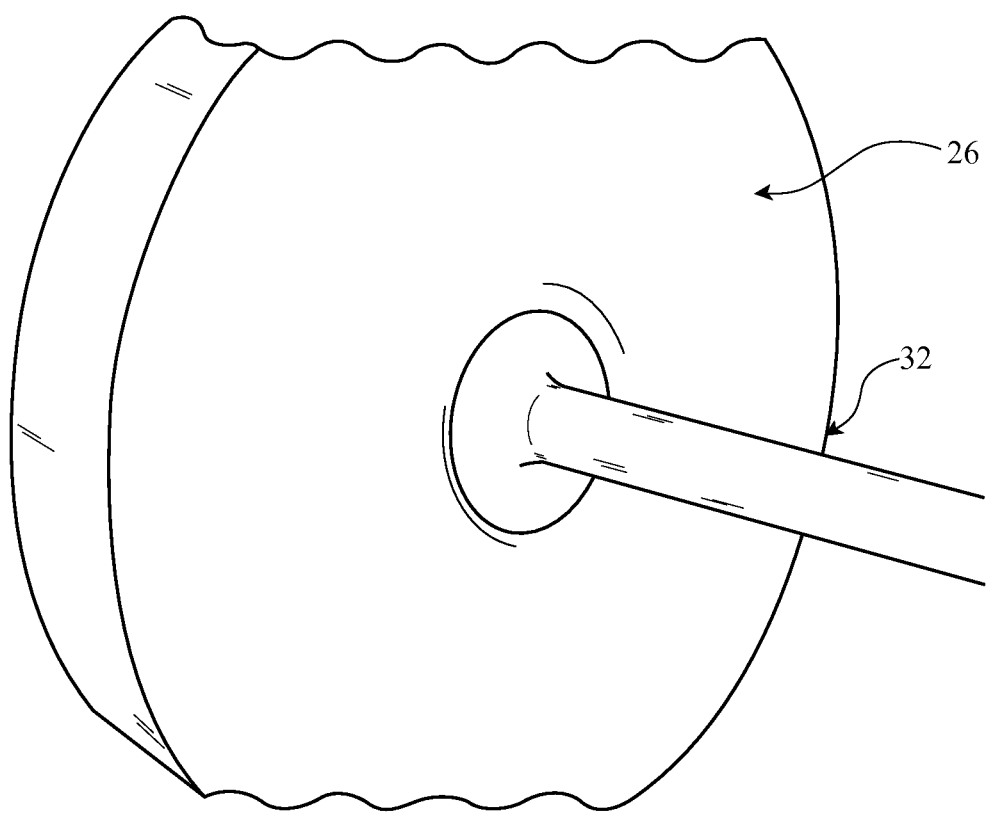
FIG. 11 shows a detailed perspective view of a second side of the preform and molded part of FIG. 9 in accordance with an embodiment of this disclosure.

After the injection and molding process is complete, the second part of the mold 20 is removed from the first part of the mold 20. FIG. 9 shows a perspective view of the overmolded preform 26 of FIG. 8 when removed from the mold 20 (i.e., with the molded part 32 attached thereto after the overmolding process and use of the mold of FIG. 6). FIGS. 10 and 11 illustrate a first side and a second side, respectively, of the overmolded preform.

As previously noted, if needed, the preform 26 and/or one or more parts of the molded part may be machined or manipulated after the molding process (e.g., to remove the preform 26 from the molded part 32).

An amorphous or non-crystalline solid is a solid that lacks lattice periodicity, which is characteristic of a crystal. As used herein, an "amorphous solid" includes "glass" which is an amorphous solid that exhibits a glass transition during heating from low temperature to the liquid state. Other types of amorphous solids include gels, thin films, and nanostructured materials. Generally, amorphous materials have lack the long-range order characteristic of a crystal though they possess some short-range order at the atomic length scale due the nature of chemical bonding. The distinction between amorphous solids and crystalline solids can be made based on lattice periodicity that can determined by structural characterization techniques such as x-ray diffraction and transmission electron microscopy.

The terms order and disorder designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true except, for example, in quasicrystals that have perfectly deterministic tilings but do not possess lattice periodicity.

Long-range order characterizes physical systems in which remote portions of the same sample exhibit correlated behavior.

This can be expressed as a correlation function, namely the spin-spin correlation function: $G(x, x')=\langle s(x), s(x')\rangle$.

In the above function, s is the spin quantum number and x is the distance function within the particular system.

This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$ then the system is said to possess long-range order. If it decays to zero as a power of the distance then it is called quasi-long-range order. Note that what constitutes a large value of $|x-x'|$ is relative.

A system is said to present quenched disorder when some parameters defining its behavior are random variables which do not evolve with time, i.e., they are quenched or frozen, for example, spin glasses. It is opposite to annealed disorder, where the random variables are allowed to evolve themselves. Embodiments herein include systems comprising quenched disorder.

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An amorphous metal is an amorphous metallic material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are called "glasses", and so amorphous metals are commonly referred to as "metallic glasses" or "glassy metals". However, there are several ways besides extremely rapid cooling in which amorphous metals can be produced, including physical vapor deposition, solid-state reaction, ion irradiation, and mechanical alloying. Amorphous alloys are a single class of materials, regardless of how they are prepared.

Amorphous metals can be produced through a variety of quick-cooling methods. For instance, amorphous metal can be produced by spraying or injecting molten metal onto a spinning metal disk. The rapid cooling, on the order of millions of degrees a second, is too fast for crystals to form and the material is "locked in" a glassy state. Also, amorphous metals can be produced with critical cooling rates low enough to allow formation of amorphous structure in thick layers (over 1 millimeter); these are known as bulk metallic glasses (BMG).

The terms "bulk metallic glass" ("BMG"), bulk amorphous alloy ("BAA"), and bulk solidifying amorphous alloy may be or are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metal can be an alloy rather than a pure metal. The alloys may contain atoms of significantly different sizes, leading to low free volume (and therefore up to orders of magnitude higher viscosity than other metals and alloys) in the molten state. The viscosity prevents the atoms from moving enough to form an ordered lattice. Such a material structure may result in low shrinkage during cooling and resistance to plastic deformation. An absence of grain boundaries, the weak spots of crystalline materials, may lead to better resistance to wear and corrosion. Amorphous metals, while technically glasses, may also be much tougher and less brittle than oxide glasses and ceramics.

The thermal conductivity of amorphous materials may be lower than of crystals. To achieve the formation of an amorphous structure even during slower cooling, the alloy may be made of three or more components, leading to complex crystal units with higher potential energy and lower chance of formation. The formation of amorphous alloy depends on several factors: the composition of the components of the alloy; the atomic radius of the components has to be significantly different (over 12%), to achieve high packing density and low free volume; the combination of components should have negative heat of mixing, inhibiting crystal nucleation and prolonging the time the molten metal stays in supercooled state. However, as the formation of an amorphous alloy is based on many different variables, it is almost impossible to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful for example as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which does not have any of the defects (such as dislocations) that limit the strength of crystalline alloys. One modern amorphous metal, known as Vitreloy, has a tensile strength that is almost twice that of high-grade titanium. However, metallic glasses at room temperature have poor or no ductility when loaded in tension. Therefore, there is considerable interest in producing metal matrix composite materials consisting of a metallic glass matrix containing dendritic particles or fibers of a ductile crystalline metal to improve ductility.

Another useful property of bulk amorphous alloys is that they are true glasses, which means that they soften and flow upon heating. This allows for easy processing, for example by injection molding, using techniques similar to those used for polymers. As a result, amorphous alloys can be used for making sports equipment, medical devices, electronic component and equipment, and thin films. Thin films of amorphous metals can be deposited via the high velocity oxygen fuel technique as protective coatings.

The term "amorphous" can also be used together with the term "phase," as in describing a material or composition of an amorphous phase or having an amorphous phase—the term "phase" can refer to one that can be found in a thermodynamic phase diagram. A phase is a region of space (a thermodynamic system) throughout which all physical properties of a material are essentially uniform. Examples of physical properties include density, index of refraction, chemical composition and lattice periodicity. A simple description is that a phase is a region of material that is chemically uniform, physically distinct, and (often) mechanically separable. In a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

The term "metal" refers to an electropositive chemical element. An amorphous metal or amorphous alloy can refer to a metal-element-containing material exhibiting only a short range order—the term "element" throughout this application refers to the element found in a Periodic Table. Because of the short-range order, an amorphous material can sometimes be described as "glassy." Thus, as explained above, an amorphous metal or alloy can sometimes be referred to as "metallic glass," or "Bulk Metallic Glass" (BMG). Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

A material can have an amorphous phase, a crystalline phase, or both. The amorphous and crystalline phases can have the same chemical composition and differ only in the microstructure—i.e., one amorphous and the other crystalline. Microstructure is defined as the structure of a material as revealed by a microscope at 25× magnification. Alternatively, the two phases can have different chemical compositions and microstructure. For example, a composition can be partially amorphous, substantially amorphous, or completely amorphous.

The degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition at least about 5 vol % of which is of an amorphous phase, such as at least about 10 wt %, such as at least 20 vol %, such as at least about 40 vol %, such as at least about 60 vol %, such as at least about 80 vol %, such at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

The term "disposing" refers to putting something in place such as to arrange or position something for use or for a particular purpose. The term "shaping" refers to giving a particular form or to cause to conform to a particular form or pattern.

In one embodiment, an amorphous alloy composition can be homogeneous with respect to the amorphous phase. A substance that is uniform in composition is homogeneous. This is in contrast to a substance that is heterogeneous. The term composition refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can be a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 5 | Pt | Cu | Ag | P | B | Si | | |
| | 74.70% | 1.50% | 0.30% | 18.0% | 4.00% | 1.50% | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y, Ln)-C—B, Co—Cr—Mo-Ln-C—B, Fe—Mn—Cr—Mo—(Y, Ln)-C—B, (Fe, Cr, Co)—(Mo, Mn)—(C, B)—Y, Fe—(Co, Ni)—(Zr, Nb, Ta)—(Mo, W)—B, Fe—(Al, Ga)—(P, C, B, Si, Ge), Fe—(Co, Cr, Mo, Ga, Sb)—P—B—C, (Fe, Co)—B—Si—Nb alloys, and Fe—(Cr—Mo)—(C, B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese patent application 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the composition consists essentially of the amorphous alloy (with only small incidental amount of impurities). In another embodiment, the composition consists of the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g.

20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Amorphous alloy systems can exhibit several desirable properties. For example, they can have a high hardness and/or hardness; a ferrous-based amorphous alloy can have particularly high yield strength and hardness. In one embodiment, an amorphous alloy can have a yield strength of about 200 ksi or higher, such as 250 ksi or higher, such as 400 ksi or higher, such as 500 ksi or higher, such as 600 ksi or higher. With respect to the hardness, in one embodiment, amorphous alloys can have a hardness value of above about 400 Vickers-100 mg, such as above about 450 Vickers-100 mg, such as above about 600 Vickers-100 mg, such as above about 800 Vickers-100 mg, such as above about 1000 Vickers-100 mg, such as above about 1100 Vickers-100 mg, such as above about 1200 Vickers-100 mg. An amorphous alloy can also have a very high elastic strain limit, such as at least about 1.2%, such as at least about 1.5%, such as at least about 1.6%, such as at least about 1.8%, such as at least about 2.0%. Amorphous alloys can also exhibit high strength-to weight ratios, particularly in the case of, for example, Ti-based and Fe-based alloys. They also can have high resistance to corrosion and high environmental durability, particularly, for example, the Zr-based and Ti-based alloys.

An amorphous alloy can have several characteristic temperatures, including glass transition temperature Tg, crystallization temperature Tx, and melting temperature Tm. In some embodiments, each of Tg, Tx, and Tm, can refer to a temperature range, instead of a discrete value; thus, in some embodiments the term glass transition temperature, crystallization temperature, and melting temperature are used interchangeably with glass transition temperature range, crystallization temperature range, and melting temperature range, respectively. These temperatures are commonly known and can be measured by different techniques, one of which is Differential Scanning Calorimetry (DSC), which can be carried out at a heating rate of, for example, about 20° C./min.

In one embodiment, as the temperature increases, the glass transition temperature Tg of an amorphous alloy can refer to the temperature, or temperature ranges in some embodiments, at which the amorphous alloy begins to soften and the atoms become mobile. An amorphous alloy can have a higher heat capacity above the glass transition temperature than it does below the temperature, and thus this transition can allow the identification of Tg. With increasing temperature, the amorphous alloy can reach a crystallization temperature Tx, at which crystals begin to form. As crystallization in some embodiments is generally an exothermic reaction, crystallization can be observed as a dip in a DSC curve and Tx can be determined as the minimum temperature of that dip. An exemplary Tx for a Vitreloy can be, for example, about 500° C., and that for a platinum-based amorphous alloy can be, for example, about 300° C. For other alloy systems, the Tx can be higher or lower. It is noted that at the Tx, the amorphous alloy is generally not melting or melted, as Tx is generally below Tm.

Finally, as the temperature continues to increase, at the melting temperature Tm, the melting of the crystals can begin. Melting is an endothermic reaction, wherein heat is used to melt the crystal with minimal temperature change until the crystals are melted into a liquid phase. Accordingly, a melting transition can resemble a peak on a DSC curve, and Tm can be observed as the temperature at the maximum of the peak. For an amorphous alloy, the temperature difference $\Delta T$ between Tx and Tg can be used to denote a supercritical region (i.e., a "supercritical liquid region," or a "supercritical region"), wherein at least a portion of the amorphous alloy retains and exhibits characteristics of an amorphous alloy, as opposed to a crystalline alloy. The portion can vary, including at least 40 wt %, at least 50 wt %, at least 60 wt %, at least 70 wt %, at least 80 wt %, at least 90 wt %, at least 99 wt %; or these percentages can be volume percentages instead of weight percentages.

Because of their desirable properties, amorphous alloys can be used in a variety of applications, including forming an interfacial layer on a substrate that is in intimate contact with the substrate or as a bonding element to bond more than one part together. The term "forming" can refer to shaping a composition into a desired or predetermined configuration. As will be discussed further below, forming can include, but is not limited to, thermoplastic forming, thermoplastic extrusion, thermoplastic shearing, soldering, over-molding, and overcastting. The process of forming can take place while a composition is disposed onto a desired location, such as a surface of a substrate, which can be, for example, a part of a mold.

The interfacial layer can effectively serve as a seal on the substrate. Because the thickness of the interfacial layer is generally much smaller than the dimensions of the part the layer is bonded to or disposed on, the layer can be considered in some embodiments as an interfacial layer. Thus, in some embodiments the term "interfacial layer" herein is used interchangeably with an "interfacial layer" or "interfacial layer, although the interfacial layer can have a certain thickness. For example, the thickness of the interfacial layer can be less than about 10 cm, such as less than about 5 cm, such as less than about 1 cm, such as less than about 5 mm, such as less than about 2 mm, such as less than about 1 mm, such as less than about 500 microns, such as less than about 200 microns, such as less than about 100 microns, such as less than about 50 microns, such as less than about 20 microns, such as less than about 10 microns, such as less than about 1 micron.

Alternatively, the alloys can form an interfacial layer between a plurality of parts to create an intimate seal between the two parts. In one embodiment, the seal can serve as a bonding element between the parts. More than two parts can be used, such as three parts, four parts, five parts, or more.

One aspect of this disclosure provides a method including overmolding a bulk-solidifying amorphous alloy on a preform of another material than the bulk-solidifying amorphous alloy to form a bulk-solidifying amorphous alloy overmolded preform. The steps as described above with respect to FIGS. 1-5 and/or FIGS. 6-11 provide examples of steps or a flow chart of an exemplary forming process in one embodiment.

Specifically, the process can include heating an at least partially amorphous composition to a first temperature that is below Tx of the composition; disposing the heated composition onto the surface of at least one part; and cooling the heated composition form an interfacial layer or seal. The composition can be a blob, have a predefined shape before making the seal, etc. For example, the composition can be disposed on a first part as a seal material, and then the second part can be brought into the seal material. Alternatively, the seal material could be pushed into cavity or void formed between two disparate parts. Yet in other embodiment, two parts could be brought into the seal material. The two parts can be preheated at the same or different temperature before making the seal.

The part(s) can serve as a substrate, and the interfacial layer can have an intimate contact with the material surface. An intimate contact can refer to being in at least substantially complete contact, such as in complete contact. Generally, such a contact refers to a lack of gap between the interfacial layer and the surface of the part/substrate. Various metrics can be used to describe the levels or degrees of complete contact. One of these is the impermeability of a fluid.

The interfacial layer, or interfacial layer, formed on a surface of a part, or several parts can create an effective seal between the surface of the part and the interfacial layer itself. In one embodiment, the interfacial layer is at least partially impermeable, such as at least substantially impermeable, such as completely impermeable to fluid, including water (i.e., "waterproof") or air (i.e., "air-tight"). The fluid can also include body fluid, such as blood, saliva, urine, or corrosive fluid, such as acidic or basic fluid, such as one that contains chloride ions. In one embodiment, the interfacial layer creates a seal that permits less than 1000 ppm, such as less than about 500 ppm, such as less than about 200 ppm, such as less than about 100 ppm, such as less than about 50 ppm, such as less than about 10 ppm, to pass through or penetrate the seal from one side of the seal to the other. The passage takes into account the passage through the seal itself and any gap present between the seal and the surface of a part (or parts).

In one embodiment wherein an interfacial layer having an amorphous alloy is formed on a part, because of the intimate contact between the interfacial layer and the part, the interfacial layer effectively forms a seal on the part. In an alternative embodiment wherein an interfacial layer is formed between two parts, the interfacial layer can form a seal between the two components. The seal can simultaneously function as a bonding element that bonds the two parts together. In one embodiment, the seal can be a hermetic seal. A hermetic seal can refer to an airtight seal that is also impermeable to fluid or micro organisms. The seal can be used to protect and maintain the proper function of the protected content inside the seal.

Depending on the application, the part or substrate, upon which an amorphous alloy composition is disposed to form an interfacial layer or seal, can be made of any material. For example, the material can include a metal, a metal alloy, a ceramic, a cermet, a polymer, or combinations thereof. The part or substrate can be of any size or geometry. For example, it can be shots, a sheet, a plate, a cylinder, a cube, a rectangular box, a sphere, an ellipsoid, a polyhedron, or an irregular shape, or anything in between. Accordingly, the surface of the part upon which the interfacial layer is formed can have any geometry, including a square, a rectangle, a circle, an ellipse, a polygon, or an irregular shape.

As previously noted, the preform or part can have a recessed surface. The recessed surface can include an undercut or a cavity. The recessed surface can have a predetermined geometry. The part can be solid or hollow. In one embodiment wherein the part is hollow, such as a hollow cylinder, the recessed surface can be on the interior surface or exterior surface of the part. In other words, the interfacial layer can form on the interior surface or the exterior surface of the part. In some embodiments, the part surface can have a roughness of any desirable size to facilitate the formation of the interfacial layer. For example, the first part can be a bezel for a watch or an electronic device housing with an undercut. Alternatively, it can have at least one cavity or undercut of random size or geometry. For example, the first part can be a mold or die (e.g., for extrusion) for the composition therein, and thus the cavity refers to the cavity space of the mold or die. In another embodiment, the first part can be the outer shell of an electrical connector that has a hollow cylindrical shape.

Multiple parts can be used. In one embodiment, an interfacial layer having an amorphous alloy can create an intimate seal between the interfacial layer with a surface of a first part and simultaneously with a surface of a second part. The interfacial layer effectively can serve as a bonding element between the two parts. The surface of each or some the parts can have roughness or recessed surface (e.g., undercut or cavity).

The two parts can be vertically aligned, horizontally aligned, or not aligned. The two parts can be joined perpendicularly to each other or parallel to each other. Also, one part can be inside of the other. For example, the first part can be a hollow shape (e.g., cylinder or rectangular box) and the second part can be a wire inside the hollow space of the first part, and the interfacial layer can be formed between the two, effectively surrounding the wire and fills at least a part of the hollow space of the first part. In this embodiment, the interfacial layer can become a seal between the wire and the cylindrical part. Alternatively, the interfacial layer can be used to join two parts of the same size and/or geometry or different size and/or geometry. For example, in one embodiment, the interfacial layer can be used as to join two pieces of the housing of an electronic device, the interfacial layer simultaneously serving as a fluid-impermeable seal between the two parts.

Because of the intimate contact provide by the interfacial layer and seal, the interfacial layer and seal can be used for a variety of applications. The interfacial layer/alloy can function as solder mass, case sealing, electrical lead for air tight or water-proof application, rivet, bonding, fastening parts together. For example, in one embodiment wherein a seal having amorphous alloy is formed between a metal-containing wire that is protruding out of a hollow cylinder, the seal can provide a water-proof and air-tight seal. Such a seal can be a hermetic seal. Also, the aforedescribed wire and cylinder assembly can be a part of various devices. For example, it can be a part of a bio-implant. For example, in the case of a Cochlear implant, the seal used for water/air tight seal and electrical/signal conductor. Alternatively, the seal can be used to seal a diamond window in analytical equipment. In another embodiment, the seal is a part of an electrical connector, with the first hollow part, for example, being the outer shell thereof.

Alternatively, it can be a part of an electronic device, such as, for example, a part of the housing of the device or an electrical interconnector thereof. For example, in one embodiment, the interfacial layer or seal can be used to connect and bond two parts of the housing of an electronic device and create a seal that is impermeable to fluid, effectively rendering the device water proof and air tight such that fluid cannot enter the interior of the device.

An electronic device herein can refer to any electronic device known in the art. For example, it can be a telephone, such as a cell phone, and a land-line phone, or any communication devices, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including portable DVD player, conventional DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard driver tower housing or casing, laptop housing, laptop keyboard, laptop track pad, desktop keyboard, mouse, and speaker. The article or seal can also be applied to device such as a watch or a clock.

All publications, patents, and patent applications cited in this application are hereby incorporated by reference in their entirety.

The terms preform and part have been used interchangeably throughout this disclosure to discuss a part for use in an apparatus upon which a bulk amorphous alloy may be bonded and molded therewith.

The articles "a" and "an" are used herein to refer to one or to more than one (i.e. to at least one) of the grammatical object of the article. By way of example, "a polymer resin" means one polymer resin or more than one polymer resin. The term "substantially" is used in conjunction with another term to describe a particular characteristic of the embodiments disclosed herein. Any ranges cited herein are inclusive. In determining the range encompassed by the term "about," one must consider the context of the term as it is used in application. For example, the term can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method comprising:
   overmolding a bulk-solidifying amorphous alloy on an outer surface of a preform of another material to form a bulk-solidifying amorphous alloy overmolded article comprising an overmolded shell, the preform comprising:
   a bottom surface;
   an exposed top surface; and
   a sidewall extending from the bottom surface to the top surface and positioned around a periphery of the bottom surface to define a side of the preform; and
   the overmolded shell defining a shelf extending towards the sidewall of the preform and defining an exposed shelf surface that is flush with the top surface of the preform.

2. The method of claim 1, wherein the another material is a metal or ceramic.

3. The method of claim 1, wherein:
   overmolding the bulk-solidifying amorphous alloy comprises injecting the bulk-solidifying amorphous alloy into a mold; and
   the method further comprises placing the preform directly into the mold prior to the injecting the bulk-solidifying amorphous alloy into the mold.

4. The method of claim 1, wherein the bulk-solidifying amorphous alloy surrounds and bonds to at least a portion of the preform.

5. The method of claim 1, wherein a wall of the overmolded shell is thinner than the sidewall of the preform.

6. The method of claim 1, further comprising placing the preform into a mold and closing the mold, wherein when the mold is closed the preform becomes clamped and immovable inside the mold.

7. The method of claim 6, wherein the preform remains in place during subsequent injection of the bulk-solidifying amorphous alloy into the mold.

8. The method of claim 7, wherein upon completion of the injection, the bulk-solidifying amorphous alloy overmolded article is removed from the mold.

9. The method of claim 8, wherein the bulk-solidifying amorphous alloy overmolded article is not post-processed by machining equipment.

10. The method of claim 8, wherein the bulk-solidifying amorphous alloy overmolded article is post-processed by machining equipment.

11. An article comprising
    a preform defining:
    a bottom surface;
    an exposed top surface; and
    a sidewall extending from the bottom portion and defining a side of the preform; and
    a bulk-solidifying amorphous alloy shell overmolded on the bottom surface and the sidewall of the preform and secured to the preform by at least one of a mechanical bond or a chemical bond, the bulk-solidifying amorphous alloy shell comprising:
    a first portion having a first thickness; and
    a second portion having a second thickness greater than the first thickness and defining a shelf extending towards the sidewall of the preform, the shelf defining an exposed shelf surface that is flush with the exposed top surface of the preform;
    wherein the preform is formed from a crystalline metal or a ceramic material.

12. The article of claim 11, wherein the preform is formed from the crystalline metal.

13. The article of claim 11, wherein the preform defines an undercut and the bulk-solidifying amorphous alloy shell mechanically engages with the undercut.

14. The article of claim 11, wherein the bulk-solidifying amorphous alloy shell has a thickness from about 0.5 mm to less than about 2 mm.

15. A housing for an electronic device comprising:
a crystalline interior member defining an internal cavity configured to receive an internal component of the electronic device and defining:
a bottom outer surface;
a top outer surface; and
a side outer surface; and
a shell of a bulk-solidifying amorphous alloy forming an exterior surface of the housing and affixed to the side outer surface of the crystalline interior member and the bottom outer surface of the crystalline interior member and defining a flange extending above the top outer surface of the crystalline interior member.

16. The housing of claim 15, wherein the crystalline interior member is formed of a metal.

17. The housing of claim 16, wherein the crystalline interior member is formed of aluminum.

18. The housing of claim 15, wherein:
the housing comprises a wall defined by the shell and the crystalline interior member; and
a thickness of a portion of the wall defined by the shell is less than a thickness of a portion of the wall defined by the crystalline interior member.

19. The housing of claim 18, wherein the portion of the wall defined by the shell has a thickness greater than about 0.5 mm and less than about 5 mm.

20. The housing of claim 15, wherein the shell has an amorphous content of more than 90% by volume.

* * * * *